United States Patent
Iseki

[11] Patent Number: 5,146,709
[45] Date of Patent: Sep. 15, 1992

[54] CUT FLOWERS DISPLAY WATER TANK
[75] Inventor: Tosiyuki Iseki, Hiroshima, Japan
[73] Assignee: Nihon Heating Service Co., Ltd., Sakai, Japan
[21] Appl. No.: 605,961
[22] Filed: Oct. 30, 1990
[30] Foreign Application Priority Data
Nov. 8, 1989 [JP] Japan .................... 1-291906
[51] Int. Cl.$^5$ .................................................. A01G 5/00
[52] U.S. Cl. .......................................... 47/41.01; 47/62
[58] Field of Search ............... 47/41.01, 41.11, 62, 47/82

[56] References Cited
U.S. PATENT DOCUMENTS

| | | | |
|---|---|---|---|
| 2,837,868 | 6/1958 | Skerritt | 47/41.01 |
| 4,255,896 | 3/1981 | Carl | 47/62 |
| 4,551,943 | 11/1985 | Pas | 47/41.01 |
| 4,608,776 | 9/1986 | Kooy | 47/41.1 |
| 4,884,364 | 12/1989 | Ferris | 47/41.01 |
| 4,899,487 | 2/1990 | Brownlee | 47/41.01 |
| 4,953,363 | 9/1990 | Primozic | 47/41.11 |

Primary Examiner—Henry E. Raduazo
Attorney, Agent, or Firm—Flynn, Thiel, Boutell & Tanis

[57] ABSTRACT

There is disclosed a cut flowers display water tank capable of prolonging the lives of the cut flowers. The cut flowers display water tanks includes water tanks and a pipe system for circulating water in the water tanks via a filter, a circulating pump and a cooler, the cooler having a coolant therein for cooling water. The cut flowers display water tank further includes a freezer for cooling the coolant in the cooler and pots removably attached to the water tanks and having slits through which the cut flowers are inserted into the water tanks.

2 Claims, 2 Drawing Sheets

CUT FLOWERS DISPLAY WATER TANK

BACKGROUND OF THE INVENTION

1. Field of the Invention

The present invention relates to an improvement of a water tank capable of prolonging lives of cut flowers inserted therein for displaying the cut flowers in a flower shop.

2. Prior Art

There were such problems in a conventional cut flowers display method and apparatus that when the water temperature rises to 20° C. or more, especially in summer season the cut flowers inserted in the water tank and displayed in a flower shop come into flower earlier and the propagation of bacteria is facilitated, whereby water is contaminated and the cut flowers are liable to be damaged in an early stage.

In view of the problems set forth above in the conventional display method and apparatus, there was a demand for enabling the lives of the cut flowers to prolong.

SUMMARY OF THE INVENTION

It is an object of the present invention to provide cut flowers display water tank capable of solving the problem of the conventional display method and apparatus as set froth above.

To achieve the object of the present invention, the cut flowers display water tank according to the present invention comprises an upper water tank and a lower water tank, a pipe system for connecting the upper water tank and the lower water tank for circulating water in both the upper and the lower water tanks, a circulating pump connected to the pipe system, a filter connected to the circulating pump for filtering water, a cooler having a coolant therein for cooling water supplied from the lower water tank and contained therein and supplying the cooled water to the upper water tank, a freezer connected to the cooler for cooling the coolant in the cooler, the filter, the cooler and the freezer being disposed under the upper water tank, and pots having a plurality of s)its defined around the circumferential surface thereof through which the cut flowers are inserted into the upper and the lower water tanks and removably attached to both the upper and the lower water tanks.

The above and other objects, features and advantages of the present invention will become more apparent from the following description taken in conjunction with the accompanying drawings.

DESCRIPTION OF THE PREFERRED EMBODIMENT

Figure 1:
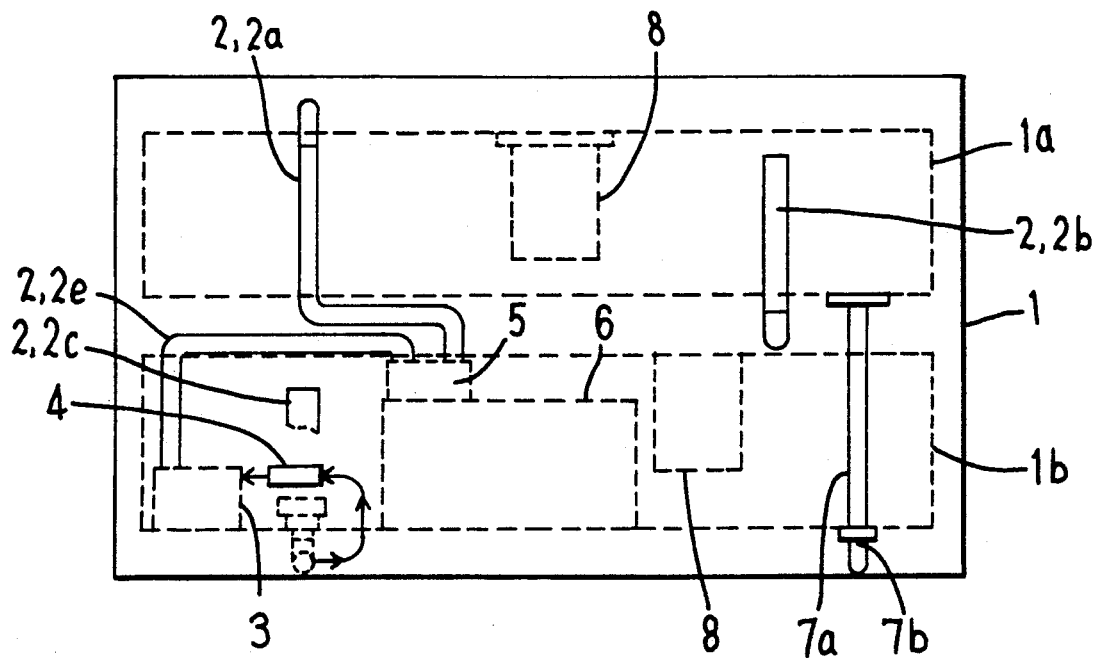
FIG. 1 is a schematic front view showing cut flowers display water tank according to a preferred embodiment of the present invention.
Figure 2:
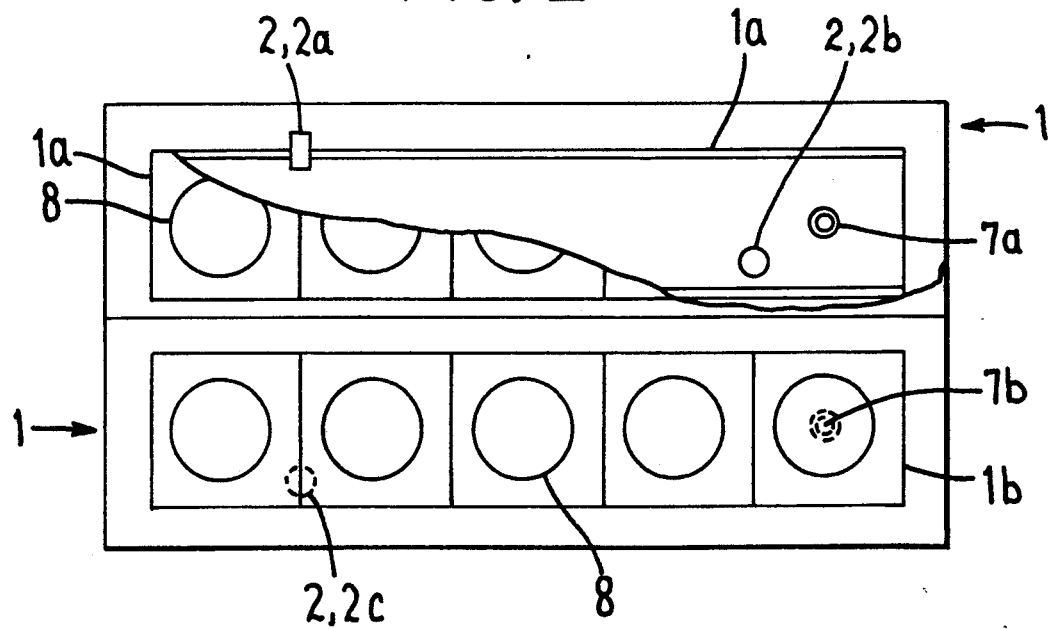
FIG. 2 is a plan view in FIG. 1.
Figure 3:
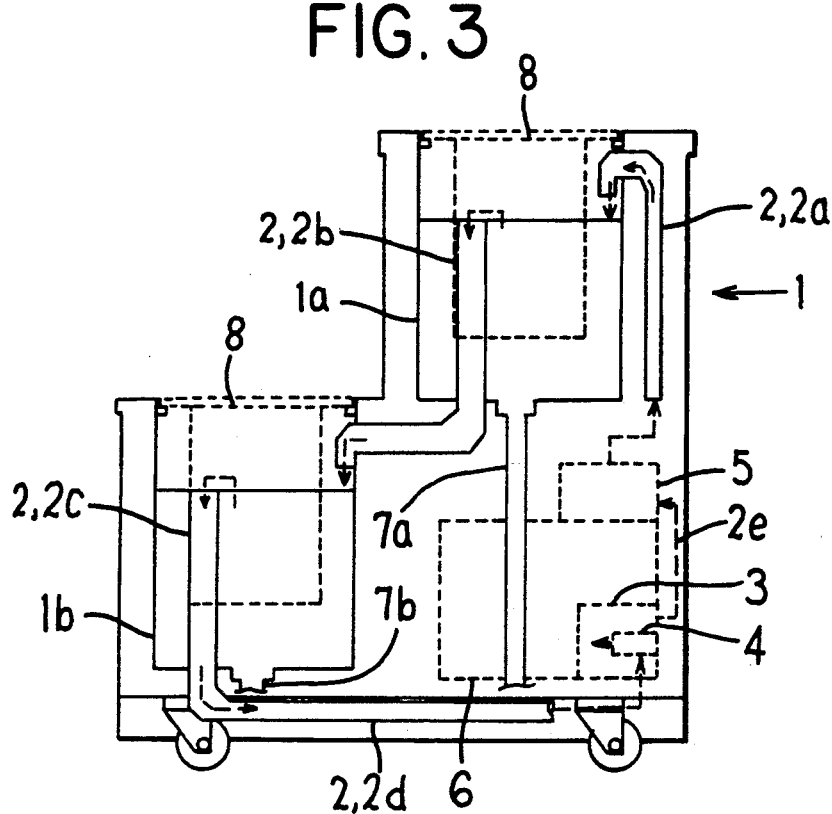
FIG. 3 is a right side view in FIG. 1.
Figure 4:
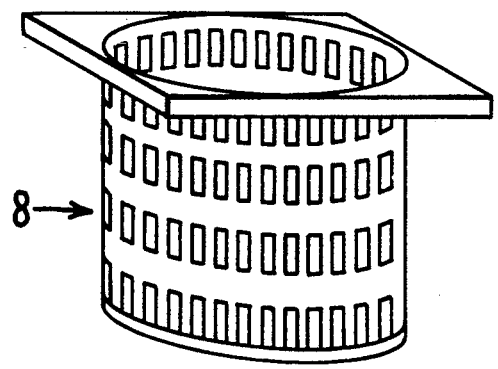
FIG. 4 is a perspective view of pots, constituents of the cut flowers display water tank in FIG. 1.

A cut flowers display water tank according to a preferred embodiment of the present invention wi)l be described with reference to FIGS. 1 to 4.

The cut flowers display water tank comprises upper and lower water tanks 1a and 1b containing water therein, a pipe system 2 including five pipes 2a to 2e for circulating water in the upper and the lower water tanks 1a and 1b, a filter 4 connected to the lower water tank 1b by way of the pipe 2c, a circulating pump 3 connected to the filter 4, a cooler 5 connected to the circulating pump 3 by way of the pipe 2e, the cooler 5 having a coolant therein for cooling water supplied from the lower water tank 1b and contained therein and supplying the cooled water to the upper water tank 1a by way of the pipe 2a, a freezer connected to the cooler 5 for cooling the coolant in the cooler 5 and pots 8 having a plurality of slits defined in the circumference thereof through which the cut flowers are inserted into the upper and the lower water tanks 1a and 1b, the pots 8 are removably attached to the upper and the lower water tanks 1a and 1b and the circulating pump 3, the cooler 5 and the freezer 6 being respectively disposed under the upper water tank 1a.

The cut flowers display water tank 1 will be described more in detail.

The water tank 1 comprises two stages of water tanks, i.e., the upper water tank 1a and the lower water tank 1b. The water tank 1 is not limited to the two stages of water tank although the present invention adopts the two stages tank.

The pipe system 2 comprises the pipe (inlet pipe) 2a for connecting the cooler 5 with the upper water tank 1a, a pipe 2b (upper overflow pipe) for connecting the upper water tank 1a with the lower water tank 1b, the pipe 2c (lower overflow pipe) for connecting the lower water tank 1b with the filter 4 through an outlet pipe 2d, and the pipe 2e for connecting the circulating pump 3 with the cooler 5. The upper and the lower overflow pipes 2b and 2c respectively keep the water surface in the upper and the lower water tanks 1a and 1b maintaining at given levels. The overflow pipe 2b is open to the lower water tank 1b at the lower end thereof.

The circulating pump 3 and the cooler 5 are incorporated in this order in the pipes 2 at the under stream of the filter 4. The freezer 6 is disposed under the cooler 5 for cooling the coolant contained in the cooler 5.

The filter 4, the circulating pump 3, the cooler 5 and the freezer 6 are respectively disposed under the upper water tank 1a. The drainage pipe 7a is connected to the bottom of the upper water tank 1a and the drainage pipe 7b is connected to the bottom of the lower water tank 1b. The drainage pipes 7a and 7b are usually closed. The cut flowers display water tank 1 is covered by a colored glass such as yellow and red glasses called VITOROGLASS (tradename) at circumferential surface thereof. The pots 8 have respectively a plurality of slits defined around the circumferential surface thereof through which the cut flowers are inserted into the upper and the lower water tanks 1a and 1b. The pots 8 are removably attached to the water tanks 1a and 1b.

An operation of the cut flowers display water tank will be described hereinafter.

Firstly, the upper and the lower water tanks 1a and 1b are filled with water, then the circulating pump 3 and the freezer 6 are driven for permitting water to circulate in the cut flowers display water tank 1 through the pipe system 2, thereafter the freezer 6 is driven for controlling to keep water temperature at 5° to 13° C., preferably at 10° C. In such state where water temperature is kept at low, the pots 8 are attached to the upper and the lower water tanks 1a and 1b.

With such an arrangement of the cut flowers display water tank, the water temperature is always kept at about 10° C. so that the following effects can be obtained.

Firstly, the cut flowers are restricted to come earlier to flower, secondly, bacteria is restricted to propagate, thirdly, water is hard to be contaminated, fourthly, the cut flower can be prolonged without a frequent exchange of water.

Although the invention has been described in its preferred form with a certain degree of particularity, it is to be understood that many variations and changes are possible in the invention without departing from the scope thereof.

What is claimed is:

1. A cut flowers display water tank comprising:
    an upper water tank and a lower water tank
    a pipe system for connecting the upper water tank and the lower water tank for circulating water in both the upper and the lower tanks;
    a circulating pump connected to the pipe system;
    a filter connected to the circulating pump for filtering water;
    a cooler having a coolant therein for cooling water supplied from the lower water tank and contained therein and supplying the cooled water to the upper water tank;
    a freezer connected to the cooler for cooling the coolant in the cooler;
    the filter, the cooler and the freezer being disposed under the upper water tank;
    pots having a plurality of slits defined around the circumferential surface thereof through which the cut flowers are inserted into the upper and the lower water tanks, the pots removably attached to both the upper and the lower water tanks.

2. A cut flowers display water tank according to claim 1, wherein the pipe system comprises an inlet pipe for connecting the cooler with the upper water tank, an upper overflow pipe for connecting the upper water tank with the lower water tank, a lower overflow pipe for connecting the lower water tank with the filter through an outlet pipe, and a pipe for connecting the circulating pump with the cooler.

* * * * *